US011810152B2

(12) United States Patent
Chen et al.

(10) Patent No.: US 11,810,152 B2
(45) Date of Patent: Nov. 7, 2023

(54) AUTOMATIC ITEM PLACEMENT RECOMMENDATIONS BASED ON ENTITY SIMILARITY

(71) Applicant: Adobe Inc., San Jose, CA (US)

(72) Inventors: Xiang Chen, San Jose, CA (US); Viswanathan Swaminathan, Saratoga, CA (US); Somdeb Sarkhel, San Jose, CA (US)

(73) Assignee: Adobe Inc., San Jose, CA (US)

( * ) Notice: Subject to any disclaimer, the term of this patent is extended or adjusted under 35 U.S.C. 154(b) by 98 days.

(21) Appl. No.: 16/598,933

(22) Filed: Oct. 10, 2019

(65) Prior Publication Data

US 2021/0110432 A1   Apr. 15, 2021

(51) Int. Cl.
*G06Q 30/0251* (2023.01)
*G06F 16/28* (2019.01)
(Continued)

(52) U.S. Cl.
CPC ..... *G06Q 30/0254* (2013.01); *G06F 16/2237* (2019.01); *G06F 16/2264* (2019.01);
(Continued)

(58) Field of Classification Search
CPC ........... G06Q 30/0254; G06Q 30/0255; G06Q 30/0277; G06Q 30/0261; G06Q 30/0264;
(Continued)

(56) References Cited

U.S. PATENT DOCUMENTS

| 2008/0027800 A1* | 1/2008 | Schabes | G06Q 30/0277 |
| | | | 705/14.54 |
| 2009/0089141 A1* | 4/2009 | Lara | G06Q 30/02 |
| | | | 705/14.43 |

(Continued)

OTHER PUBLICATIONS

Bezes,"Similarity in marketing: Scope, measurement, and fields of application", Nov. 2016, pp. 83-105.

(Continued)

*Primary Examiner* — Sam Refai
*Assistant Examiner* — Kyle G Robinson
(74) *Attorney, Agent, or Firm* — FIG. 1 Patents

(57) ABSTRACT

Automatic item placement recommendation is described. An item placement configuration system receives an item for which a recommended placement is to be generated and identifies an entity associated with the item. The item placement configuration system then identifies a multi-domain taxonomy that describes relationships between different entities based on items associated with the different entities published among different domains. A representation of the entity associated with the item to be placed is then identified within the multi-domain taxonomy, along with a representation of at least one similar entity. Upon identifying a similar entity, historic item placement metrics for the similar entity are leveraged to generate a placement recommendation for the received item. In some implementations, the placement recommendation is output with a visual indication of a similar entity and associated performance metrics that were considered in generating the recommended placement.

7 Claims, 10 Drawing Sheets

(51) Int. Cl.
  *G06F 16/22* (2019.01)
  *G06Q 30/0241* (2023.01)
(52) U.S. Cl.
  CPC ....... *G06F 16/285* (2019.01); *G06Q 30/0255* (2013.01); *G06Q 30/0261* (2013.01); *G06Q 30/0264* (2013.01); *G06Q 30/0277* (2013.01)
(58) Field of Classification Search
  CPC ............. G06F 16/285; G06F 16/2237; G06F 16/2264; G06F 16/9535; G06F 16/9536; G06F 16/906
  See application file for complete search history.

(56) References Cited

U.S. PATENT DOCUMENTS

| | | | | |
|---|---|---|---|---|
| 2009/0164274 | A1* | 6/2009 | Narayanaswamy | G06Q 20/108 705/70 |
| 2009/0222316 | A1* | 9/2009 | Boinepalli | G06Q 30/00 705/7.29 |
| 2011/0236870 | A1* | 9/2011 | Chinosornvatana | G09B 7/08 434/322 |
| 2011/0258529 | A1* | 10/2011 | Doig | G06Q 30/02 726/22 |
| 2014/0304069 | A1* | 10/2014 | Lacey | G06Q 30/0249 705/14.48 |
| 2019/0266283 | A1* | 8/2019 | Shukla | G06N 20/00 |
| 2020/0210833 | A1* | 7/2020 | Xu | G06N 7/01 |

OTHER PUBLICATIONS

Bijmolt,"Judgements of Brand Similarity", International Journal of Research in Marketing 15, No. 3, Jan. 1998, pp. 249-268.
Biei,"Latent dirichlet allocation", Journal of Machine Learning Research, Jan. 2003, 30 pages.
Deerwester,"Indexing by Latent Semantic Analysis", Journal of the American society for information science 41, No. 6, Sep. 1990, pp. 391-407.
Loken,"Consumer "Confusion" of Origin and Brand Similarity Perception", Jan. 1986, pp. 195-211.
Ribeiro-Neto,"Impedance Coupling in Content targeted Advertising", Aug. 2005, 8 pages.
Robertson,"Relevance Weighting of Search Terms", Journal of the American Society for Information science 27, No. 3, May 1976, pp. 129-146.
Zhang,"Advertising Keywords Recommendation for Short-Text Web Pages Using Wikipedia", ACM Transactions on Intelligent Systems and Technology (TIST) 3, Feb. 2012, 25 pages.

* cited by examiner

AUTOMATIC ITEM PLACEMENT RECOMMENDATIONS BASED ON ENTITY SIMILARITY

Websites and other digital platforms often cater to the highest bidder, such that entities who pay the most are awarded the right to display their digital content at desired placements (e.g., on certain websites, at certain times, in certain languages, and so forth). However, there are no guarantees that an awarded placement will enable the highest bidder to publish digital content in a manner that reaches a target audience for the digital content. Consequently, entities often purchase rights to publish digital content items at more locations than necessary to reach the target audience, which requires additional computational resources to communicate digital content items through a content delivery pipeline and additional data storage to host the digital content items at the various locations. By publishing digital content items at more locations than necessary, users who are not interested in viewing the highest bidder's content are forced to navigate through vast amounts of digital content items before ultimately arriving at content of interest, which further wastes computational resources and results in user frustration.

To mitigate these problems, conventional targeted content delivery approaches implement demand-side platforms, which enable entities to specify certain goal criterion (e.g., number of impressions, conversions, clicks, etc.) for digital content to be published, along with various publishing criterion (e.g., at certain geographic locations, for user profiles having certain attributes, at certain positions on a website, and so forth) for the digital content. However, given the vast number of possible combinations for publishing criteria, entities are often forced to make judgement calls based on information describing their own past performance in publishing content. Consequently, entities are forced to rely on personal domain knowledge and expend large amounts of resources in fine-tuning content placement configurations to achieve a barely adequate strategy for content delivery, often publishing digital content while failing to reach target audiences.

SUMMARY

Automatic item placement recommendations for publishing a digital content item is described. An item placement configuration system receives a request for a placement recommendation for a digital content item. In order to determine an optimal placement for the item, the item placement configuration system identifies an item type of the digital content item as well as an entity associated with the digital content item and leverages historic placement metrics for entities that have published similar types of digital content items. To do so, the item placement configuration system obtains a multi-domain taxonomy corresponding to the identified item type of the digital content item. The multi-domain taxonomy includes information describing relationships between different entities based on digital content items that are associated with the different entities and published among different domains.

For instance, in an example implementation where a digital content item to be published corresponds to a product, the multi-domain taxonomy may be a classification scheme representative of various product categories, such as a tree structure where non-leaf nodes represent different product categories, and leaf nodes represent scores identifying a degree of relevance between the respective category and a given entity. In this manner, the multi-domain taxonomy represents different entities as defined by their associated digital content items published to different domains.

The item placement configuration system then identifies, from the multi-domain taxonomy, a representation of the entity associated with the digital content item to be placed. As described in further detail below, because the multi-domain taxonomy is useable to visually cluster similar entities together in close spatial proximity, the item placement configuration system identifies at least one similar entity for the entity associated with the digital content item to be placed. The item placement configuration system then ascertains historic item placement metrics associated with the at least one similar entity and outputs one or more recommended placements based on the historic item placement metrics. In some implementations, the item placement configuration system is configured to additionally output a display of the historic item placement metrics considered in generating such a recommended placement configuration.

In some implementations, the item placement configuration system is configured to generate the multi-domain taxonomy used in generating the automatic item placement recommendation. For instance, the item placement configuration system may crawl various domains to identify items and collect information associated with the items, such as associated textual descriptions, embedded metadata, and so forth, which is used to generate the tree structure of the multi-domain taxonomy. The item placement configuration system is further configured to generate entity representations within the context of the multi-domain taxonomy. To do so, information describing the various items associated with the entity is compiled into a k-dimensional vector, where each dimension represents an item category in the multi-domain taxonomy, with a corresponding value representing an affiliation between the entity and the item category. The item placement configuration system is further configured to generate representations for any number of different entities, such that each entity is represented by a respective k-dimensional vector. The resulting vectors can then be used to calculate differences and similarities between different entities.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures.

DETAILED DESCRIPTION

Overview

Figure 1:
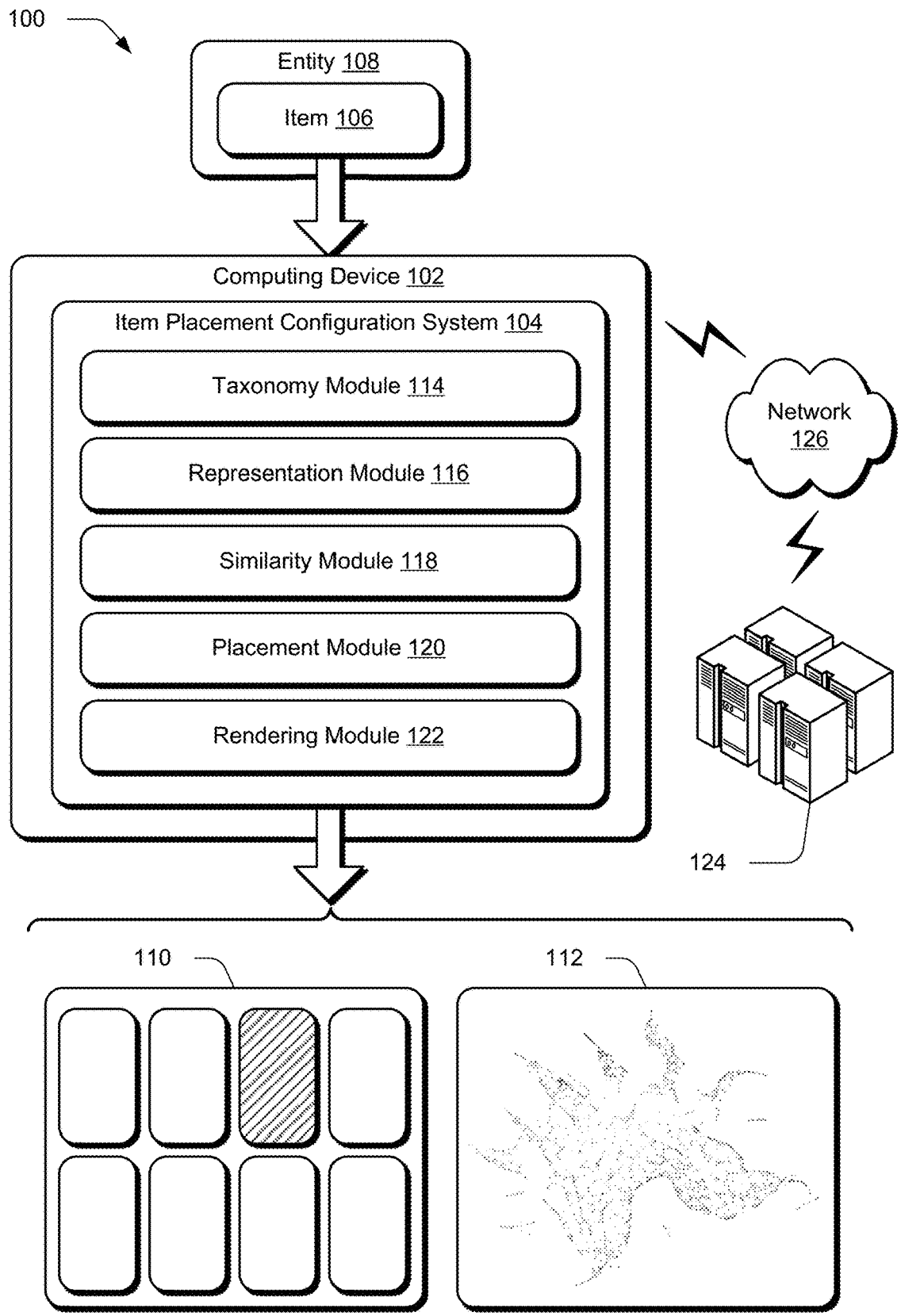
FIG. 1 is an illustration of an environment in an example implementation that is operable to employ the automatic item placement recommendation techniques described herein.

With increases in the number of sources that publish digital content items and diverse interests of different computing device users, targeted delivery of digital content has become more difficult. For instance, in an example scenario where a website has a limited number of locations available for entities to publish digital content, increasing numbers of entities are forced to compete with one another for the rights to present content at these locations. As a result, websites, applications, and other digital content platforms often cater to the highest bidder, such that entities who pay the most are awarded the limited locations for content placement. However, there are no guarantees that digital content provided by even the highest bidders will reach intended audiences.

Consequently, entities often purchase the rights to publish digital content at more locations than necessary to reach a target audience, which requires additional data storage and other computational resources to maintain and communicate through a digital content delivery pipeline. Furthermore, computing device users who are not interested in viewing the highest bidders' content are forced to navigate through vast amounts of content before ultimately arriving at content of interest, which further wastes computational resources and results in user frustration.

Conventional approaches to determining placement configurations for digital content items include demand-side platforms, which enable entities to specify certain goal criterion (e.g., number of impressions, conversions, clicks, etc.) for digital content to be published, along with various publishing criterion (e.g., at certain geographic locations, for user profiles having certain attributes, at certain positions on a website, and so forth). However, given the vast number of possible combinations for various criterion to be used in reaching the target audience, it remains a challenge for entities to identify the optimal criterion to be used in targeting digital content items towards an intended user audience. Consequently, entities are forced to rely on personal domain knowledge and expend large amounts of resources in fine-tuning content placement configurations to achieve a barely adequate strategy for content delivery, often publishing items while failing to reach a target audience.

Thus, there is a need to generate recommended placements for digital content items in a manner that does not require an entity to pre-specify targeting criteria for publishing a digital content item. Furthermore, there is a need to generate recommended placements for the digital content items in a manner that considers information from a variety of different domains and different entities, such that a recommended placement is not limited to past entity-specific or domain-specific metrics.

Accordingly, automatic item placement recommendations for placing a digital content item in a user interface is described. An item placement configuration system receives a digital content item and an indication of an entity associated with the item. In order to determine an optimal placement for the item, the item placement configuration system is configured to leverage historic information describing placement metrics for items associated with different entities that are identified as being similar to the entity associated with the digital content item to be placed. To do so, the item placement configuration system generates a multi-domain taxonomy from on information describing items associated with, various entities across a variety of different domains.

As described herein, a placement configuration for an item refers to a manner in which the particular item should be published on, or otherwise placed in, one or more domains. For instance, a placement configuration for a digital content item may specify certain user interfaces in which the item should be placed, such as in specific application user interfaces, in specific websites, as accompanying certain other digital content items, combinations thereof, and so forth. A placement configuration may alternatively or additionally specify that the item should be placed in user interfaces that are output for display to certain demographic groups, output in a certain language, output for display at certain geographic regions, output for display at certain times, combinations thereof, and so forth. In a similar manner, a placement configuration may indicate certain user interfaces that should be excluded from including placement of the item. In some implementations, the placement configuration for an item further indicates various audience segments to which the item should be targeted for display, which in turn may affect other characteristics of a recommended placement configuration (e.g., user interface languages, user interface traffic types such as websites or applications, device-specific user interfaces, combinations thereof, and so forth).

To generate the multi-domain taxonomy, the item placement configuration system is configured to crawl various domains to identify published digital content items and collect information associated with the items, such as an identification of an associated entity, textual descriptions of the item, embedded item metadata, and so forth. In an example scenario where the items associated with an entity each represent a product offered for sale by the entity, the multi-domain taxonomy may be a classification scheme representative of various product categories in the form of a tree structure, where non-leaf nodes represent different product categories, and leaf nodes represent scores identifying a degree of relevance between the respective category and the entity.

Because the multi-domain taxonomy is generated based on information collected from a plurality of different domains, the multi-domain taxonomy provides a comprehensive classification of how a particular entity relates to digital content items. To generate a robust multi-domain taxonomy, the item placement configuration system is configured to perform this process for a plurality of different entities, such that the resulting multi-domain taxonomy represents relationships of different entities. Given the vast amount of information used to generate the multi-domain taxonomy, the item placement configuration system is configured to generate the multi-domain taxonomy offline, or prior to receiving a request for a recommended placement of a digital content item. In this manner, the recommended placement for the digital content item can be generated and output online, or in real-time, without requiring the network and computational resources that are otherwise necessary to construct the multi-domain taxonomy on-demand (e.g., upon receipt of the request for the recommended placement). In this manner, the techniques described herein improve the efficiency of a computing device implementing the item placement configuration system while simultaneously reducing an amount of computational resources required by the computing device to do so.

After generating the multi-domain taxonomy, the item placement configuration system generates a representation of the entity within a context of the multi-domain taxonomy. To do so, the information describing the various items associated with the entity is compiled into a k-dimensional vector, where each dimension represents an item category in the multi-domain taxonomy and the corresponding value provides a score indicating how closely an entity is related to the particular item category. The item placement configuration system is configured to generate similar representations for any number of different entities, such that each entity is represented by a respective k-dimensional vector.

Using these vectors, the item placement configuration system generates one or more entity clusters. Each cluster provides a visual indication of the entity's overall similarity to other entities described in the multi-domain taxonomy. For instance, each entity may be visually represented as a dot in a cluster map, where entities having similar k-dimensional vector values are positioned close to one another, while dissimilar entities are positioned distant from one another. In order to visualize each entity in the clusters, the item placement configuration system is configured to implement a t-distributed stochastic neighbor embedding (T-SNE) machine learning algorithm. Alternatively or additionally, the item placement configuration system may generate the clusters by implementing another nonlinear dimensionality reduction technique suitable for embedding higher-dimensional data into a low-dimensional space of two or three dimensions.

For a given entity, similar entities can be readily identified from the clusters based on proximity between respective dots. In some implementations, the item placement configuration system is configured to output information describing an entity in response to receiving input at a dot representing the entity within a cluster of multiple entities. For instance, in response to receiving input selecting a dot representation of an entity, the item placement configuration system may output a display of a word cloud describing a cluster including the dot representation, a graph representing a distribution of entity scores relative to different item categories, example instances of collected items associated with the entity, combinations thereof, and so forth. Thus, the clusters generated from a multi-domain taxonomy provide transparency to a viewing user regarding the information considered by the item placement configuration system in identifying similar entities.

In addition to the visual representation of the clusters, the item placement configuration system is configured to mathematically score similarities between different entities. To do so, given two different entities and their respective k-dimensional vectors, the item placement configuration system calculates the cosine distance between the two vectors. The resulting similarity scores are then used to generate a ranked list of entities that are most similar to a designated entity. Using one or more similar entities, the item placement configuration system ascertains historic item placement metrics associated with the one or more similar entities. As described herein, item placement metrics refer to click-through rates, overall number of impressions, conversion rates, social media referrals, return on market investment, combinations thereof, and other key performance indicators associated with various item placement configurations of the one or more similar entities.

The item placement configuration system is configured to output one or more recommended placements for the digital content item based on the historic item placement metrics associated with the similar entities. For instance, the item placement configuration system may identify a placement configuration of an item in a given user interface layout for a similar entity with top-ranked item placement metrics relative to other possible placement configurations and output a recommendation indicating that the item should be placed in a similar placement configuration. In some implementations, the item placement configuration system is configured to output a display of the historic item placement metrics that were considered in generating such a recommended placement configuration.

For example, the item placement configuration system may output information describing a forecast estimate of a cost associated with securing the recommended placement, an estimated number of resulting impressions, conversions, and the like, a degree of confidence associated with the forecast estimates, and so forth. Further, the item placement configuration system is configured to output an interface that enables an entity to subsequently specify targeting criteria for placement of the item, such as particular website categories, particular languages, particular publishing locations, intended audience segments, combinations thereof, and so forth. In this manner, the item placement configuration system presents an intuitive interface that outputs a recommended placement for a given item and its predicted performance metrics, along with comprehensive information describing similar entities that were considered in generating the recommended placement.

The entity may then select one of the recommended placements, or the item placement configuration system may automatically select a top-ranked recommended placement for the item, independent of user input. The item placement configuration system then outputs a configured user interface that includes the digital content item placed according to the selected placement. In this manner, the techniques described herein enable generation of recommended placements for digital content items in a manner that identifies similar entities and historic placement metrics for the similar entities to determine an informed forecast of the item's performance as output in the recommended placement configuration.

In contrast to conventional approaches, the techniques described herein enable generation of recommended placements for a digital content item without requiring an entity associated with the item to specify targeted criteria for placement of the item, such as specific websites and/or geolocations at which the item is to be displayed, target audiences at which the item is directed, or otherwise require knowledge or insight regarding a domain in which the item is to be published. Furthermore, the techniques described herein are configured to generate recommended placements for a digital content item by considering vast amounts of data that is otherwise unable to be distilled by conventional approaches. For example, the techniques described herein may consider thousands of entities in generating a recommended placement, which in turn may each require consideration of millions of items. As such, the amount of data considered by the item placement configuration system using the techniques described herein is substantially greater than that considered by conventional approaches, which are often limited to domain-specific information or data that is particular to a single entity.

Example Environment

FIG. 1 is an illustration of a digital medium environment 100 in an example implementation that is operable to employ the techniques described herein. The illustrated environment 100 includes a computing device 102, which may be implemented in various configurations. The computing device 102, for instance, may be configured as a desktop computer, a laptop computer, a mobile device (e.g., assuming a handheld configuration such as a tablet or mobile phone), and so forth. Thus, the computing device 102 may range from a full resource device with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers to perform operations "over the cloud" as described with respect to FIG. 10.

The computing device 102 is illustrated as including an item placement configuration system 104. The item placement configuration system 104 represents functionality of the computing device 102 to receive a digital content item 106 to be output in a user interface. The item 106 is associated with entity 108, and in some implementations may be received directly from the entity 108 by the item placement configuration system 104. Given the item 106, the item placement configuration system 104 is configured to generate a recommended placement 110 for the item 106 independent of any prior knowledge describing an intended target audience for the item 106, a domain in which the user interface including the recommended placement 110 is hosted, a particular layout configuration of the user interface, or other information indicating desired performance metrics for placement of the item 106.

The item placement configuration system 104 is further configured to generate an entity cluster 112, which visually indicates a computed degree of similarity between the entity 108 and one or more different entities. As described in further detail below, because the recommended placement 110 is generated based on historic placement metrics for entities that are similar the entity 108, the entity cluster 112 includes information describing a rationale behind generating the recommended placement 110 such that entity 108 can make an informed decision as to whether or not to proceed with publishing the item 106 using the recommended placement 110.

To generate the recommended placement 110 and the entity cluster 112, the item placement configuration system 104 employs a taxonomy module 114, a representation module 116, a similarity module 118, a placement module 120, and a rendering module 122. The taxonomy module 114, the representation module 116, the similarity module 118, the placement module 120, and the rendering module 122 are each implemented at least partially in hardware of the computing device 102 (e.g., through use of a processing system and computer-readable storage media), as described in further detail below with respect to FIG. 10.

The taxonomy module 114 is configured to generate a multi-domain taxonomy that includes information describing, for each of a plurality of different entities, a plurality of different items that are associated with the entity. These items are identified by the taxonomy module 114 across a plurality of different domains. For instance, the taxonomy module 114 may crawl different domains to identify items that are associated with individual entities and collect information associated with the items, such as associated textual descriptions, embedded metadata, and so forth. Information associated with the items is used to generate categories and sub-categories for describing the entities in the context of their respectively published items, with similar categories being grouped together to account for different word preferences used to describe similar items in different domains.

In this manner, the multi-domain taxonomy can be represented as a tree structure, where non-leaf nodes correspond to categories or sub-categories, and leaf nodes correspond to an individual item type, such as a specific type of the item 106. Thus, the multi-domain taxonomy is representative of hierarchical structure that classifies different entities in a uniform manner, as described in further detail below with respect to FIG. 3.

This multi-domain taxonomy is useable by the representation module 116 to generate a representation of each of the entities that were considered by the taxonomy module 114 in generating the multi-domain taxonomy. For instance, in response to receiving the item 106, the representation module 116 is configured to ascertain an identity of the entity 108. The representation module 116 then generates a representation of the entity 108 using the multi-domain taxonomy. In some implementations, the representation of entity 108 is a k-dimensional vector, where each dimension corresponds to a leaf node of the tree structure represented by the multi-domain taxonomy, with a corresponding value indicating an item distribution of the entity 108 with respect to the leaf node. In this manner, the k-dimensional vector representing entity 108 includes information describing an affiliation between a particular item type and the entity 108. The representation module 116 is configured to generate entity representations using the multi-domain taxonomy for any number of different entities.

These entity representations are then communicated to the similarity module 118, which uses the entity representations to generate the entity cluster 112. As described in further detail below with respect to FIG. 4, the entity cluster 112 provides a visual indication of the entity's representation relative to the multi-domain taxonomy. For instance, each entity may be represented as a dot in a cluster map, where entities having similar k-dimensional vector values are consequently positioned close to one another. Conversely, dissimilar entities are positioned distant from one another, as indicated by the information collected from items associated with the entities across various different domains. The similarity module 118 is further configured to identify entities that are similar to the entity 108. To do so, the similarity module 118 calculates the cosine distance between the two k-dimensional vectors representing the entity 108 and at least one different entity. This process can be repeated for any combination of different entities, such that the similarity module 118 outputs a ranked list of entities that are similar to the entity 108.

The similarity module 118 communicates these similar entities to the placement module 120, which is configured to generate one or more recommended placements for the item 106 based on historic placement metrics associated with the similar entities identified by the similarity module 118. For instance, the placement module 120 may identify a placement configuration for a similar entity with top-ranked historic item placement metrics relative to other possible placement configurations and output a recommendation indicating that the item 106 should be oriented in the user interface according to the identified placement configuration. In some implementations, the recommended placement is generated by the placement module 120 based on placement metrics from a plurality of different similar entities identified by the similarity module 118.

To inform entity 108 of the basis behind the recommended placement for the item 106, the placement module 120 is further configured to output a display of similar entity placement metrics that were considered in generating the recommended placement, such that entity 108 can make an informed decision as to whether or not to proceed with publishing the item 106 using the recommended placement.

The rendering module 122 is representative of functionality to output a display of information generated by the item placement configuration system 104, such as the recommended placement 110 generated by the placement module 120 and the entity cluster 112 generated by the similarity module 118. The rendering module 122 is further configured to generate and output a configured user interface that includes the item 106 placed in one or more domains according to the recommended placement 110.

The recommended placement 110, the entity cluster 112, the configured user interface, and other information generated by the item placement configuration system 104 may be stored in storage of the computing device 102 together with the item 106, as described in further detail below with respect to FIG. 10. Alternatively or additionally, the item placement configuration system 104 is configured to provide the item 106, the recommended placement 110, the entity cluster 112, and additional information described in further detail below with respect to FIGS. 2-9 to a remote storage location for subsequent retrieval and/or access by the computing device 102 or different computing devices. For instance, the item placement configuration system 104 may communicate information to remote storage 124, or directly to a different computing device, via network 126.

Figure 2:
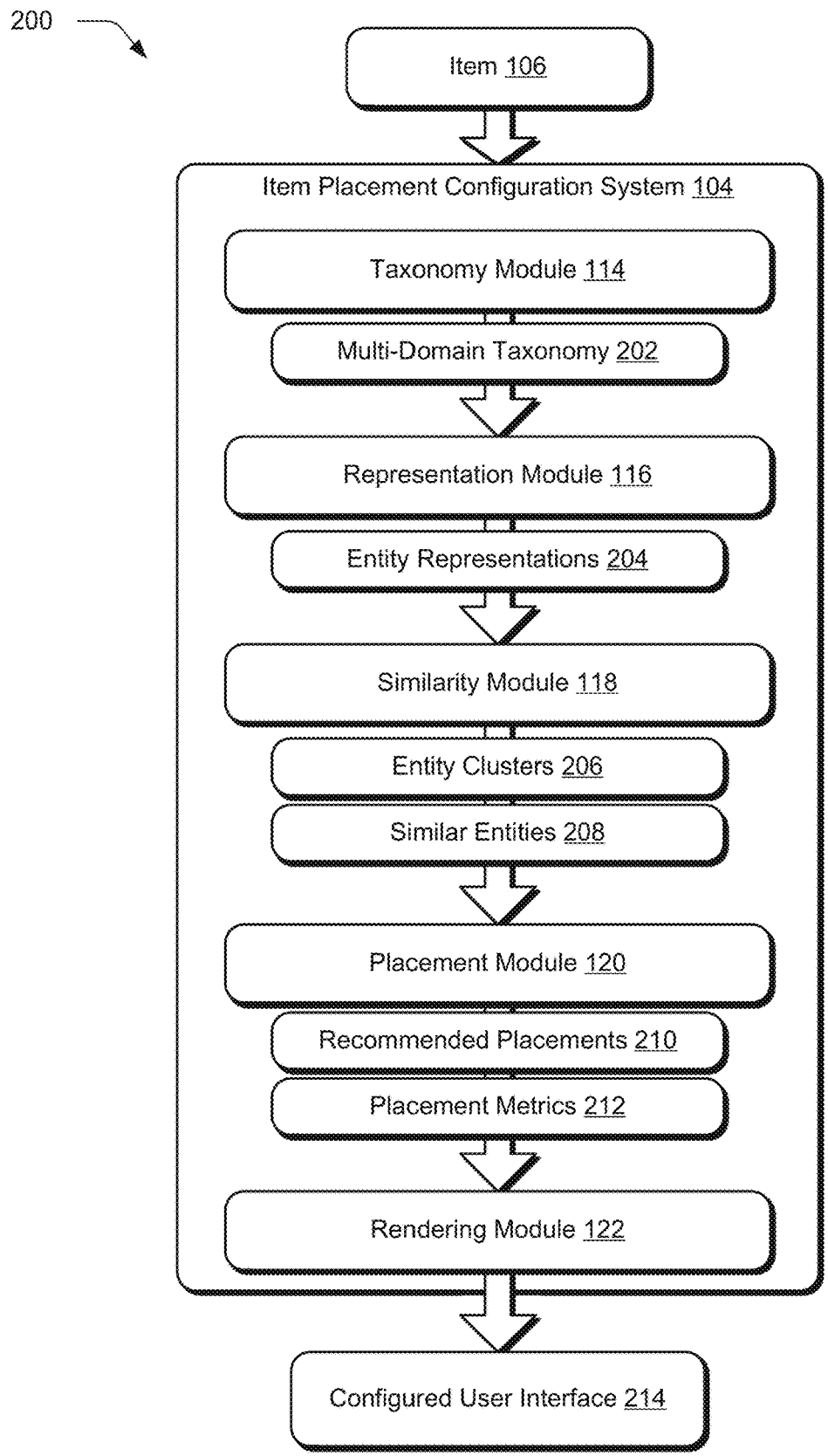
FIG. 2 illustrates an example implementation in which an item placement configuration system of FIG. 1 generates a configured user interface that includes a digital content item using techniques described herein.

Having considered an example digital medium environment, consider now a discussion of an example system useable to generate an output recommended placements for entity items in accordance with aspects of the disclosure herein. FIG. 2 illustrates an example system 200 useable to generate a configured user interface 214 that includes an item 106 positioned according to a recommended placement, such as the recommended placement 110 illustrated in FIG. 1, in accordance with the techniques described herein. In the illustrated example, system 200 includes modules of the item placement configuration system 104 as described with respect to FIG. 1, e.g., taxonomy module 114, representation module 116, similarity module 118, placement module 120, and rendering module 122. System 200 may be implemented on any suitable device or combination of devices. In one example, system 200 is implemented on one computing device (e.g., computing device 102 of FIG. 1). In another example, system 200 is implemented on more than one computing device, as described in further detail below with respect to FIG. 10.

In the example system 200, the item placement configuration system 104 receives the item 106. In accordance with one or more implementations, the item placement configuration system 104 receives the item 106 together with an identifier of the entity 108 associated with the item 106. Alternatively, the item placement configuration system 104 is configured to ascertain an identity of entity 108 by analyzing metadata of the item 106, by comparing the item 106 to items having known associated entities, by prompting a user of the item placement configuration system 104 for an identify of entity 108, and so forth. As described herein, the item 106 is representative of any form of digital content that may be output in a digital user interface. For instance, the item 106 may be an image representative of a product or service offered for sale by an entity, may be text authored by an entity (e.g., a news story authored by a news service, a social media post authored by an individual, etc.), may be a video or animated image file, combinations thereof, and so forth. In some implementations, the item 106 is received by the item placement configuration system 104 along with information specifying what is included in the item 106.

For example, the accompanying information may indicate that the item 106 is an image of a shoe with descriptive text indicating a type of shoe along with an affiliated brand, manufacturer of the shoe, location for purchase of the shoe, an individual user that posted the item 106 to their personal social media account, and so forth. Continuing this example, the associated entity may be any of the affiliated brand, the manufacturer of the shoe, a company at the location for purchase of the shoe, the individual user that posted the shoe to their personal social media account, and so forth.

In response to receiving the item 106, the taxonomy module 114 outputs a multi-domain taxonomy 202. The multi-domain taxonomy 202 output by the taxonomy module 114 is selected based on an item type of the item 106. For instance, in response to determining that the item 106 corresponds to an image of a product offered for sale by entity 108, the taxonomy module 114 identifies a product-specific multi-domain taxonomy and outputs the product-specific multi-domain taxonomy as the multi-domain taxonomy 202. In a similar manner, in response to determining that the item 106 corresponds to a video produced by an entity, the taxonomy module 114 identifies a video-specific multi-domain taxonomy and outputs the video-specific multi-domain taxonomy as the multi-domain taxonomy 202. Thus, the multi-domain taxonomy 202 is identified by the taxonomy module 114 based on an item type of the item 106.

In order to output the multi-domain taxonomy 202 in near real-time as the item 106 is received by the item placement configuration system 104, the taxonomy module 114 is configured to generate the multi-domain taxonomy 202 prior to receipt of the item 106. To do so, the taxonomy module may access a plurality of different domains (e.g., different online marketplaces, different online news sources, different video hosting platforms, different social networking platforms, combinations thereof, and so forth) and collect information describing various items published to the different domains.

Using this collected information, the taxonomy module 114 identifies various instances of a given item and analyzes information for each of the identified instances, such as an identifier of an entity associated with the item, metadata describing the item, a textual description of the item, a domain location from which the item was collected, and so forth. Using this collected item information, the taxonomy module 114 determines whether there are any similarities between two or more of the items, such as item descriptions indicating that the two or more items are appropriately categorized as related to one another. To do so, the taxonomy module 114 is configured to perform text processing on each item identified from the plurality of different domains.

For instance, the taxonomy module 114 may identify a first plurality of items having associated descriptions indicating that the respective items can be categorized as "Baby & Toddler Clothing" items, identify a second plurality of items having associated descriptions indicating that the respective items can be categorized as "baby & toddler boy clothing" items, and identify a third plurality of items having associated descriptions indicating that the respective items can be categorized as "newborn outfit" items. Because different domains may use different language to describe similar items, the taxonomy module 114 accounts for vocabulary impedance, or different word preferences, in categorizing entity items by performing word processing to classify individual entity items. For instance, the taxonomy module 114 may incorporate any suitable type of natural language processing, such as stop-word removal and stemming, Word2Vec, k-means, combinations thereof, and so forth, to categorize various items used to generate the multi-domain taxonomy 202.

After analyzing various items from the different domains and classifying the items by grouping similar items into common categories, the taxonomy module 114 is configured to calculate an entity score for each leaf node included in the multi-domain taxonomy 202. In this manner, the taxonomy module 114 generates a tree structure that is useable by the item placement configuration system 104 to describe a degree of relevance between each of the item categories in the multi-domain taxonomy 202 and each of the different entities associated with the items that were collected to generate the multi-domain taxonomy 202. For instance, consider FIG. 3, which illustrates an example of a multi-domain taxonomy 202 generated in accordance with the techniques described herein.

Figure 3:
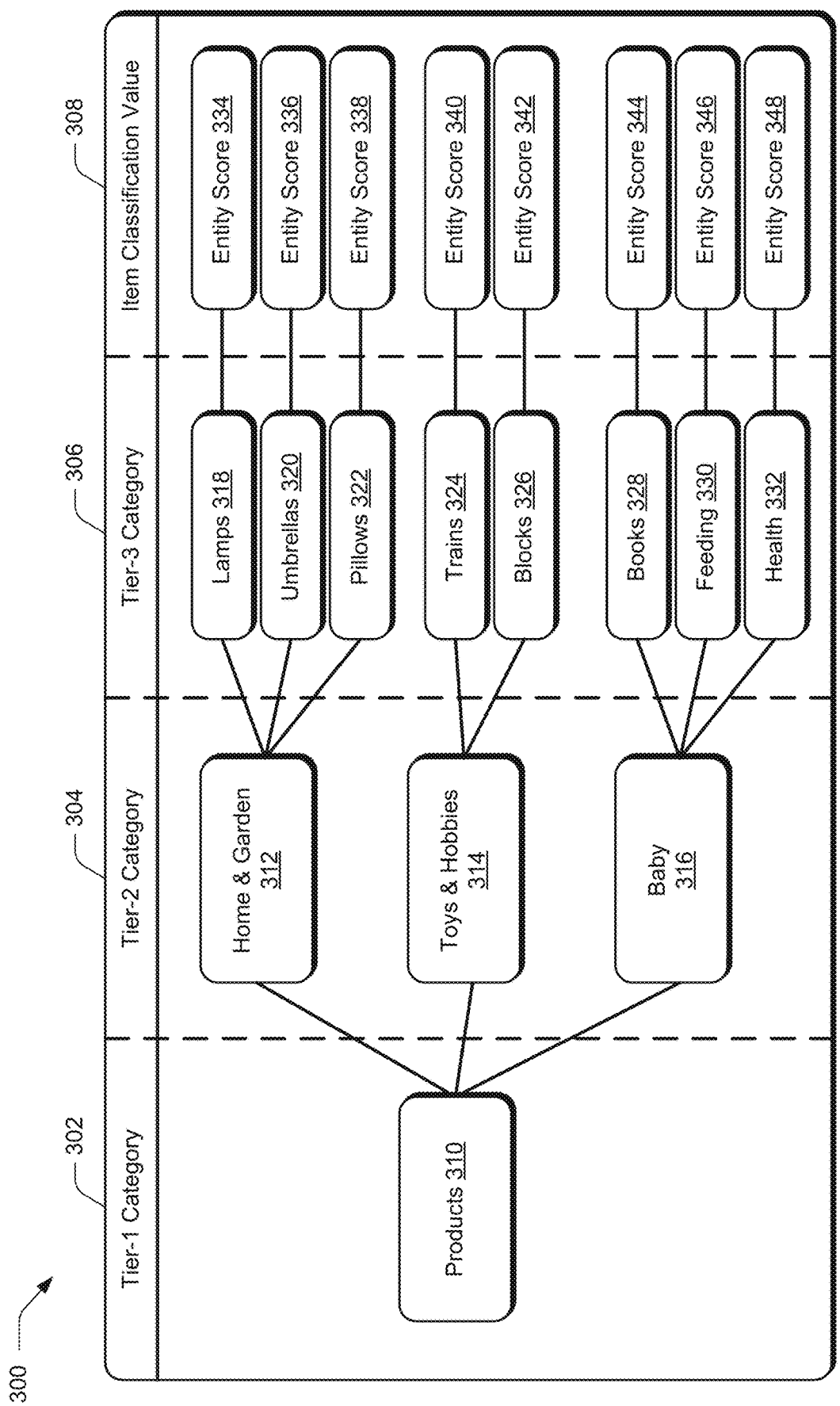
FIG. 3 illustrates an example implementation of a multi-domain taxonomy generated by the item placement configuration system of FIG. 1.

FIG. 3 illustrates an example implementation 300 of the taxonomy module 114 of generating a multi-domain taxonomy 202 using the techniques described herein. The illustrated example 300 includes a multi-domain taxonomy represented as a tree structure, where the tier-1 category column 302 corresponds to a top-level descriptor of the multi-domain taxonomy 202, the tier-2 category column 304 represents a mid-level descriptor of the multi-domain taxonomy 202, the tier-3 category column 306 represents a bottom-level descriptor for the multi-domain taxonomy 202, and the item classification value column 308 represents entity scores for individual entities relative to the bottom-level descriptors of the multi-domain taxonomy 202.

The illustrated example 300 is representative of a multi-domain taxonomy 202 generated for a product item type, as indicated by the node 310 in the tier-1 category column 302. In order to generate the multi-domain taxonomy for items associated with a product item type, the taxonomy module 114 analyzes a plurality of different domains and identifies individual items from each of the different domains that include information indicating that the individual items correspond to products. Using the item information, the taxonomy module 114 generates a plurality of different categories into which individual ones of the product-type items can be classified. For instance, the illustrated example includes three separate mid-level categories into which items of the products 310 may be categorized, represented by the home & garden category 312, the toys & hobbies category 314, and the baby category 316. Although only three separate mid-level descriptors are illustrated in the example 300, the taxonomy module 114 is configured to generate a multi-domain taxonomy 202 having any suitable number of mid-level descriptors, which in turn may each have one or more mid-level descriptors stemming therefrom. In this manner, the multi-domain taxonomy can be represented as a tree structure, where non-leaf nodes are representative of categories into which multiple different items may be grouped and leaf nodes are each representative of different instances of an item, as specified by the item type included in the top-level node, or the tier-1 category column 302 in the illustrated example 300.

Leaf nodes in the illustrated example 300 are included in the tier-3 category column 306, and are representative of different product items that are respectively assigned to the mid-level descriptor as indicated by the lines between the tier-2 category column 304 and the tier-3 category column 306. For instance, under the home & garden category 312, the multi-domain taxonomy of the illustrated example 300 includes three separate item classifications: lamps 318, umbrellas 320, and pillows 322. Under the toys & hobbies category 314, the multi-domain taxonomy includes two separate item classifications: trains 324 and blocks 326. Finally, under the baby category 316, the multi-domain taxonomy includes three separate item classifications: books 328, feeding 330, and health 322. The taxonomy module 114 is configured to assign each item collected from the multiple different domains to one of the item classifications 318, 320, 322, 324, 326, 328, 330, or 332 based on information associated with each of the items as obtained from the respective domains. In this manner, each of the leaf node item classifications 318, 320, 322, 324, 326, 328, 330, and 332 are representative of one or more specific items included in a domain, such as offered for sale in an online marketplace, included in an advertisement on a website, published in a comment on a social networking platform, and so forth.

After identifying different product-type items from different domains, the taxonomy module 114 is configured to compute scores that indicate a correlation between individual entities and each of the item classifications 318, 320, 322, 324, 326, 328, 330, and 332. For instance, in an example scenario where individual entities correspond to manufacturers of the different item classifications 318, 320, 322, 324, 326, 328, 330, and 332, the resulting entity score computed by the taxonomy module 114 may be indicative of a number of items offered for sale by the manufacturer as included in respective ones of the item classifications 318, 320, 322, 324, 326, 328, 330, and 332.

Continuing this example, entity score 334 is indicative of a number of lamps 318 manufactured by the entity that were identified by the taxonomy module 114 across the plurality of different domains. Likewise, the entity score 336 is indicative of a number of umbrellas 320 manufactured by the entity and the entity score 338 is indicative of a number of pillows 322 manufactured by the entity, as identified by the taxonomy module from items included in the plurality of analyzed domains.

In an alternate example scenario where the entity scores are generated for an entity that corresponds to a retail location offering various items for sale, the entity score 340 may be indicative of a number of train items 324 identified in the plurality of different domains by the taxonomy module 114 with information indicating that the train item is offered for sale by the retail location. In a similar manner, the entity score 342 may be indicative of a number of block items 326 identified by the taxonomy module 114 across the different domains that included information indicating the block item is offered for sale by the retail location.

In another example scenario where the entity scores are generated for an entity that corresponds to an advertiser of various product items, the entity score 344 may be indicative of a number of baby book items 328 advertised by the advertiser across the plurality of different domains. Similarly, the entity scores 346 and 348 may be indicative of a number of baby feeding items 330 and a number of baby health items 332, respectively, advertised by the advertiser across the plurality of different domains. Although the illustrated example only includes a single entity score associated with each of the item classifications 318, 320, 322, 324, 326, 328, 330, and 332, the taxonomy module 114 is configured to generate multiple entity scores for each of the item classifications, such as one for any number of different entities. The taxonomy module 114 is configured to regularly update the multi-domain taxonomy 202 to account for new items and new entities that were previously not represented in the multi-domain taxonomy 202. In this manner, in an example implementation where the item 106 is received after the item placement configuration system 104 has generated the multi-domain taxonomy 202, the taxonomy module 114 is configured to update the multi-domain taxonomy 114 by mapping the item 106 to the existing multi-domain taxonomy 202, such that additional leaf nodes are not added to the multi-domain taxonomy 202. Alternatively or additionally, the taxonomy module 114 may re-generate the multi-domain taxonomy 202 upon receipt of the item 106 using the steps previously described.

In this manner, the taxonomy module 114 is configured to generate a multi-domain taxonomy 114 that classifies items by type, clusters similar items into common categories, and computes scores indicating a degree of relevance between each item category and an individual entity.

Returning to FIG. 2, the taxonomy module 114 communicates the multi-domain taxonomy 202 corresponding to the item type of the item 106 to the representation module 116. Upon receipt of the multi-domain taxonomy 202, the representation module 116 is configured to generate an entity representation 204 for an entity associated with the item 106, within the context of the multi-domain taxonomy 202. To do so, the representation module 116 generates a k-dimensional vector for the entity associated with the item 106, where each dimension represents one of the item classifications 318, 320, 322, 324, 326, 328, 330, or 332 and is assigned a value corresponding to the respective entity score 334, 336, 338, 340, 342, 344, 346, or 348. In some implementations the value for each dimension of the k-dimensional vector may represent an item distribution of the corresponding item classification as associated with the entity, such as a value indicating a number of items in the item classification corresponding to the entity relative to an overall number of items in the item classification.

In this manner, the value of k may be any suitable number and is limited only by a number of different leaf nodes of the multi-domain taxonomy 202, such as a number of different item classifications included in the tier-3 category column 306 of the example implementation 300. In some implementations, the representation module 116 may specify a limited number of dimensions for an entity's k-dimensional vector representation, using entity scores for the entity as indicated in the multi-domain taxonomy 202. For instance, the representation module 116 may limit the entity representation to a 64-dimension vector, where each dimension represents one of the entity scores for the entity associated with the item 106, as indicated in the multi-domain taxonomy 202. The representation module 116 is further configured to generate an entity representation 204 for any number of different entities having associated entity scores included in the multi-domain taxonomy 202. In some implementations, the representation module 116 is configured to prompt a user of the item placement configuration system 104 for an indication of certain entities for which an entity representation 204 is to be generated.

After generating the entity representations 204, the representation module 116 communicates the entity representations 204 to the similarity module 118. The similarity module 118 is configured to generate one or more entity clusters 206 from the entity representations 204 and identify at least one similar entity 208 for the content provide associated with the item 106. In order to generate the entity cluster 206, the similarity module visualizes each of the entity representations 204 generated by the representation module 116. To do so, the similarity module 118 is configured to implement a t-distributed stochastic neighbor embedding (T-SNE) machine learning algorithm, which embeds the k-dimensional data of an entity representation 204 into a low-dimensional space of two or three dimensions. Alternatively or additionally, the similarity module may generate the entity clusters 206 using another nonlinear dimensionality reduction technique capable of embedding higher-dimensional data into a low-dimensional space of two or three dimensions. An example of an entity cluster 206 generated by the similarity module 118 is illustrated in FIG. 4.

Figure 4:
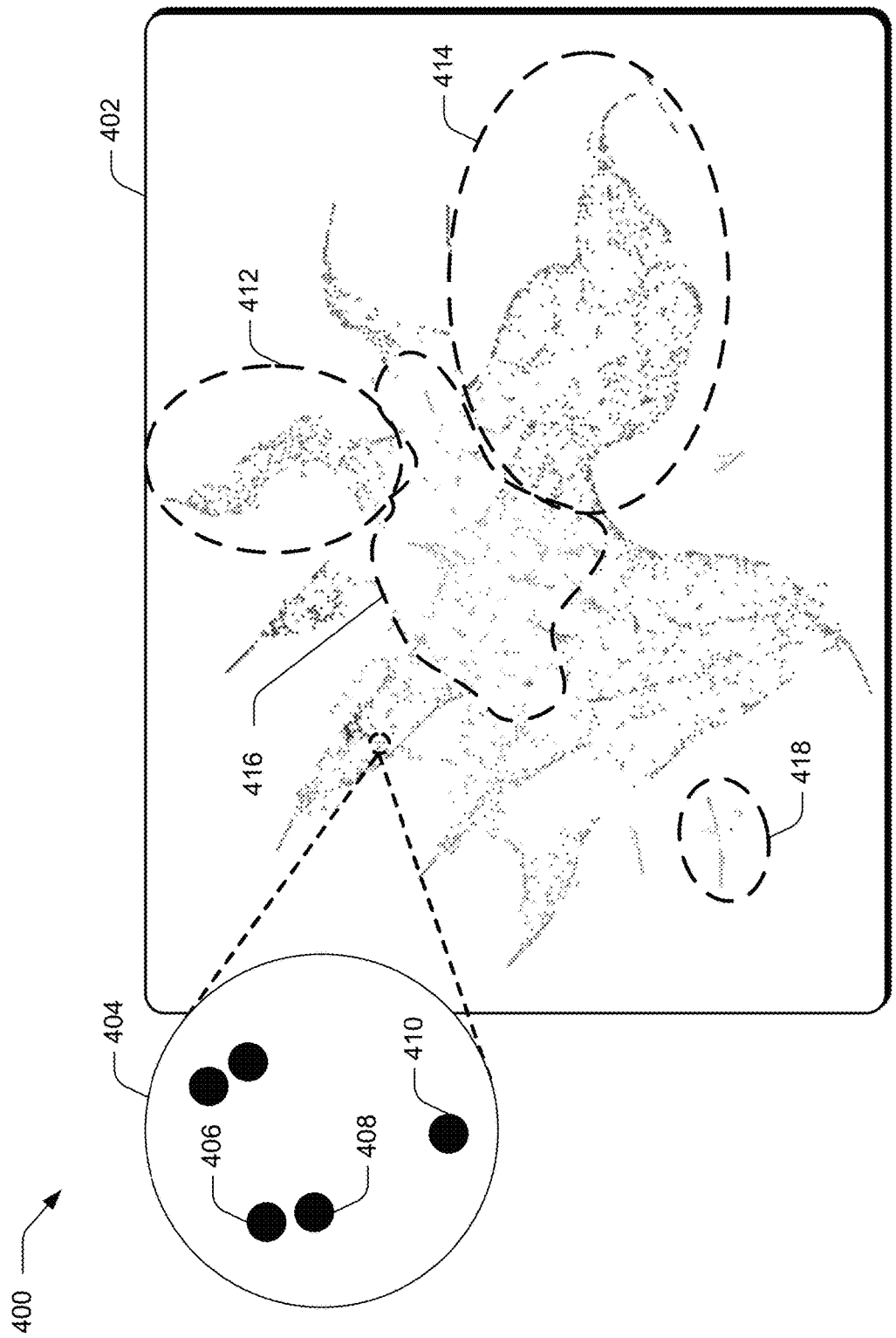
FIG. 4 illustrates an example implementation of clusters generated by the item placement configuration system of FIG. 1.

FIG. 4 illustrates an example implementation 400 of an entity cluster 402 generated by the item placement configuration system 104 in accordance with the techniques described herein. In the illustrated example, the entity cluster 402 includes a plurality of dots in a two-dimensional space, where each of the dots corresponds to an individual entity representation 204 generated by the representation module 116. As illustrated in magnified detail 404, dot 406 may be representative of a first entity, dot 408 may be representative of a second entity, and dot 410 may be representative of a third entity. Based on the proximity of dots 406, 408, and 410 as rendered by applying the T-SNE machine learning algorithm to the entity representations 204, the represented first, second, and third entities may be identified as relatively similar to one another. The entity cluster 402 further indicates that the first and second entities, represented by dots 406 and 408, respectively, are more similar to one another than the first entity and the third entity represented by dot 410. Thus, the entity cluster 402 indicates similarities and differences between different entities in an intuitive manner that is readily understood via visual observation of the entity cluster 402.

In accordance with one or more implementations, the entity cluster 402 is representative of a single cluster generated from multiple entity clusters 206. For instance, a first entity cluster 206 may correspond to the group of dots encompassed by the bounded region 412, a second entity cluster 206 may correspond to the group of dots encompassed by the bounded region 414, and a third entity cluster 206 may correspond to the group of dots encompassed by the bounded region 416. Similarly, a fourth entity cluster 206 may correspond to the group of dots encompassed by the bounded region 418, indicative of entities that are relatively dissimilar from entities included in the bounded regions 412, 414, and 416.

In this manner, the similarity module 118 of the item placement configuration system 104 is configured to generate a visual representation of any number of different entities within the context of a multi-domain taxonomy generated for a particular item type of the item 106, such as the multi-domain taxonomy 202. Thus, the entity cluster 402 may include any suitable number of entity clusters 206. In some implementations, the similarity module 118 is configured to cluster entity representations 204 into a predetermined number of clusters using k-means clustering techniques.

For instance, a user of the item placement configuration system 104 may specify that the similarity module is to generate ten different entity clusters 206 using k-means clustering, and visualize the results of the k-means clustering using T-SNE to achieve the entity cluster 402 in the example implementation 400. The similarity module 118 may further generate the entity clusters 206 to include information further describing data used to generate to the entity cluster 206 and/or information corresponding to individual ones of the entities represented as dots within the entity cluster 206, in order to assist a viewing user in understanding what is represented by the entity cluster 402.

Figure 5:
FIG. 5 illustrates an example implementation of clusters generated by the item placement configuration system of FIG. 1.

FIG. 5 illustrates an example implementation 500 of displaying information describing data used to generate the entity cluster 402 and information describing an individual entity represented as a dot within the entity cluster 402. In the example implementation 500, input is illustrated as being received via cursor 502 at a portion of the entity cluster 402 bounded by the region 504. The portion of the entity cluster 402 bounded by the region 504 may be representative of one of the entity clusters 206 generated by the similarity module 118, where the entity cluster 402 is generated from a number of different entity clusters 206. In such a scenario, responsive to receiving input at the entity cluster 402 within the bounded region 504, the item placement configuration system 104 is configured to output cluster information 506 describing a general topic of each cluster.

For instance, in the example implementation 500, cluster information 506 includes a word cloud identifying a topic of each cluster, such as a "home & garden" cluster. In some implementations, the cluster information 506 may be identified from the various dimensionalities of the entity representations 204 corresponding to the dots included in the bounded region 504. Continuing the example of FIG. 3, where the multi-domain taxonomy 202 is generated for product-type items, the cluster information 506 may consequently indicate that the entities grouped within are indicative of entities having high distributions of associated home & garden product items published across the different domains considered in constructing the multi-domain taxonomy 202.

The entity cluster 402 may further be interacted with to cause output of entity information 508 for a specific entity as represented by a dot in the entity cluster 402. For instance, in response to receiving input at a dot of the entity cluster 402, such as via cursor 502, the item placement configuration system 104 outputs entity information 508 describing various dimensionalities and values of the corresponding entity as indicated by the multi-dimensional vector generated for the entity in the entity representation 204. In the illustrated example 500, the entity information 508 indicates that a dot selected by the cursor 502 corresponds to an entity having a 12.2% distribution of baby items across a plurality of different domains, a 19.4% distribution of toys & hobbies items across the plurality of different domains, and a 68.3% distribution of home & garden items across the plurality of different domains. In this manner, the entity clusters 206 are generated by the similarity module 118 to include information that transparently describes data collected and interpreted by the item placement configuration system 104 in the generation thereof.

Returning to FIG. 2, using the entity representations 204 and the entity clusters 206, the similarity module 118 is configured to identify at least one similar entity 208 for an entity associated with the item 106, such as one or more entities similar to entity 108. To identify the similar entities 208, the similarity module 118 is configured to calculate a degree of similarity between two different entities based on their respective entity representations 204. For instance, to determine whether a first entity and a second entity are similar to one another, the similarity module 118 obtains the k-dimensional vectors for the first and second entities from their respective entity representations 204. The similarity module 118 then determines entity similarity according to Equation 1:

$$\text{Similarity} = \frac{(b_i \cdot b_j)}{(\|b_i\| * \|b_j\|)} \qquad \text{(Eq. 1)}$$

In Equation 1, $b_i$ represents the k-dimensionality vector for the first entity and $b_j$ represents the k-dimensionality vector for the second entity, and the similarity is calculated based on the cosine distance between the two vectors. The similarity module 118 is configured to perform this similarity computation for any number of entities in order to identify entities most similar to an entity associated with item 106, such as entity 108. Based on the similarity scores, the similarity module 118 may identify a single entity or a group of multiple entities that exhibit the greatest similarity to an entity associated with item 106. In accordance with one or more implementations, similar entities are identified by comparing the resulting similarity score of Equation 1 to a similarity score threshold, which may be pre-designated by the item placement configuration system 104 or be specified by a user of the item placement configuration system 104. These similar entities are then output by the similarity module 118, represented by similar entities 208.

The similarity module 118 communicates the similar entities 208 to the placement module 120, which is configured to identify top-ranked placement configurations associated with the similar entities 208. To do so, the placement module 120 ascertains an identity of an entity included in the similar entities 208 and queries a database storing historic placement configurations for the identified entity along with performance metrics associated with each of the historic placement configurations. In some implementations the database is a demand-side advertising platform implemented remotely from the item placement configuration system 104 that stores historic item placement configurations and performance metrics, such as total item impressions, item click-through rates, item conversions, and so forth, associated with each of the historic item placement configurations. The placement module 120 may identify one or more top-ranked placement configurations for the similar entities 208 and use the one or more top-ranked placement configurations as a basis for generating the recommended placements 210 for the item 106.

The recommended placements 210 may specify any suitable type of information for placement of the item 106 in a digital user interface. For instance, the recommended placements 210 may indicate that the item 106 should be placed in a user interface containing certain types of news stories, should be placed in a certain position of a plurality of available positions in the user interface, should be placed in user interfaces displayed to certain demographic groups and/or geographic regions, should be placed in user interfaces for display at certain times, combinations thereof, and so forth. To assist a user of the item placement configuration system 104 in determining whether or not to proceed with a recommended placement 210 for the item 106, the placement module 120 is further configured to output placement metrics 212 considered in generating the recommended placements 210. Examples of a recommended placement 210 and placement metrics 212 are illustrated in FIG. 6.

Figure 6:
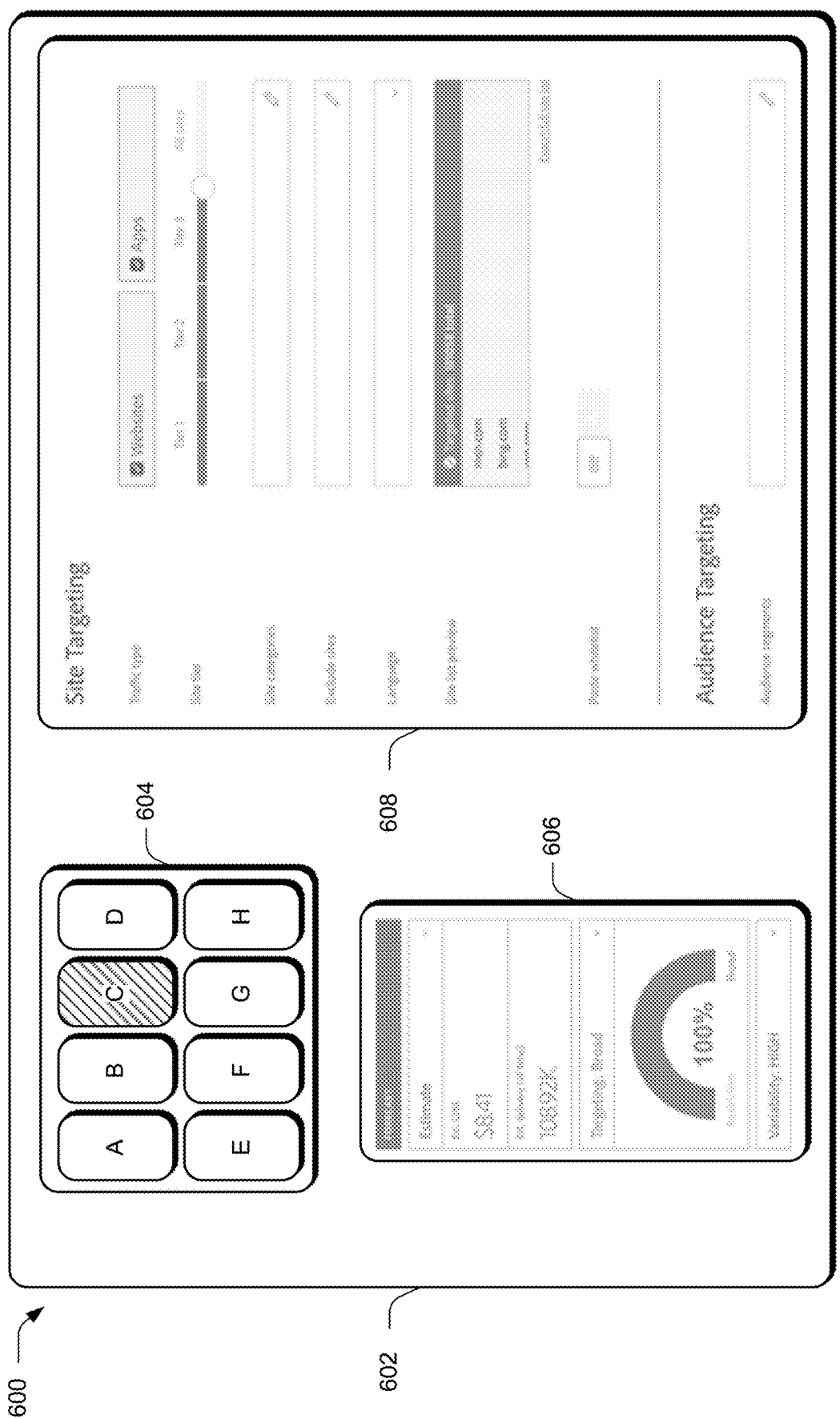
FIG. 6 illustrates an example implementation of an interface that includes a recommended placement and placement metrics generated by the item placement configuration system of FIG. 1.

FIG. 6 illustrates an example implementation 600 of a recommended placement 210 generated for an item 106 based on one or more placement metrics 212. The illustrated example 600 includes an interface 602 that includes a display of a recommended placement 604. The recommended placement 604 illustrates an example user interface having eight possible positons for placement of the item 106, as illustrated by slots A, B, C, D, E, F, G, and H. In the illustrated example, the recommended placement 604 indicates that the item 106 should be placed in slot C of the user interface. To assist a user of the item placement configuration system 104 in determining whether or not to proceed with placing the item 106 in the user interface according to the recommended placement 604, the interface 602 further includes a display of placement metrics 606.

The placement metrics 606 are representative of forecast estimate values of placing the item 106 according to the recommended placement 604. For instance, the placement metrics may specify an estimate cost-per-impression required to secure placement of the item 106 according to the recommended placement 604, may specify an estimated overall number of impressions of the item 106 as placed according to the recommended placement 604, may specify a percentage confidence associated with the forecast estimate values, may specify a degree of variability associated with the forecast estimate values, and so forth. In this manner, the placement metrics 212 generated by the placement module 120 enable a user of the item placement configuration system 104 to make an informed decision as to whether or not to proceed with publishing the item 106 in certain domains, at certain locations within the domain, at certain times, combinations thereof, and so forth, as specified by the recommended placement 604. The item placement configuration system 104 is thus configured to leverage similar entity information to output a recommended placement for an item 106 independent of any prior information specifying a desired placement, target audience, or the like for the item 106.

Optionally, the interface 602 may further include targeting controls 608, which are representative of functionality that enables a user of the item placement configuration system 104 to fine-tune the recommended placement 604 to obtain a personalized placement. For instance, the targeting controls 608 may include options that are selectable to specify a traffic type in which to place the item 106, such as in websites, in applications, combinations thereof, and so forth. The targeting controls 608 may additionally enable a user of the item placement configuration system 104 to further specify traffic types in which to place the item 106, such as by designating explicit websites and/or applications in which the item 106 is to be placed, certain tiers of websites in which the item 106 is to be placed, certain categories of websites in which the item 106 is to be placed, certain websites in which the item 106 is not to be placed, certain languages associated with placement of the item 106, combinations thereof, and so forth. The targeting controls 608 may further enable a user of the item placement configuration system 104 to specify certain audience segments for which the item 106 is to be presented, along with any other suitable control that enables a user of the item placement configuration system to specify placement criteria, such as date ranges, budget goals, optimization goals, and the like, for placement of the item 106.

In response to receiving input at the targeting controls 608, the item placement configuration system 104 is configured to updated the corresponding placement metrics 606 and/or the recommended placement 604, such that a user of the item placement configuration system 104 is dynamically provided with updated information describing a recommended placement for the item 106 along with predicted placement metrics indicating a degree of success with respect to the specified targeting criteria if the item 106 were placed in the recommended placement 604.

Returning to FIG. 2, the placement module 120 communicates the one or more recommended placements 210 to the rendering module 122, which is configured to generate at least one configured user interface 214, which is representative of the item 106 being placed according to the recommended placements 210. In some implementations, the rendering module 122 is configured to output a plurality of different configured user interfaces 214, one for each of a plurality of different recommended placements 210. Alternatively or additionally, the rendering module 122 may output a single configured user interface 214 that is generated based on a combination of multiple different recommended placements 210. In some implementations, the rendering module 122 is configured to automatically output the configured user interface 214, independent of input from a user of the item placement configuration system 104. Alternatively, the rendering module 122 may output the configured user interface 214 together with a prompt for a user of the item placement configuration system 104 to indicate acceptance of the configured user interface 214. In such an implementation, responsive to an indication of acceptance of the configured user interface 214, the item placement configuration system 104 is configured to publish the item 106 according to the recommended placement as represented by the configured user interface 214.

Having considered example details of generating a recommended placement for an item, consider now some example procedures to illustrate aspects of the techniques.

Example Procedures

The following discussion describes techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference may be made to FIGS. 1-6.

Figure 7:
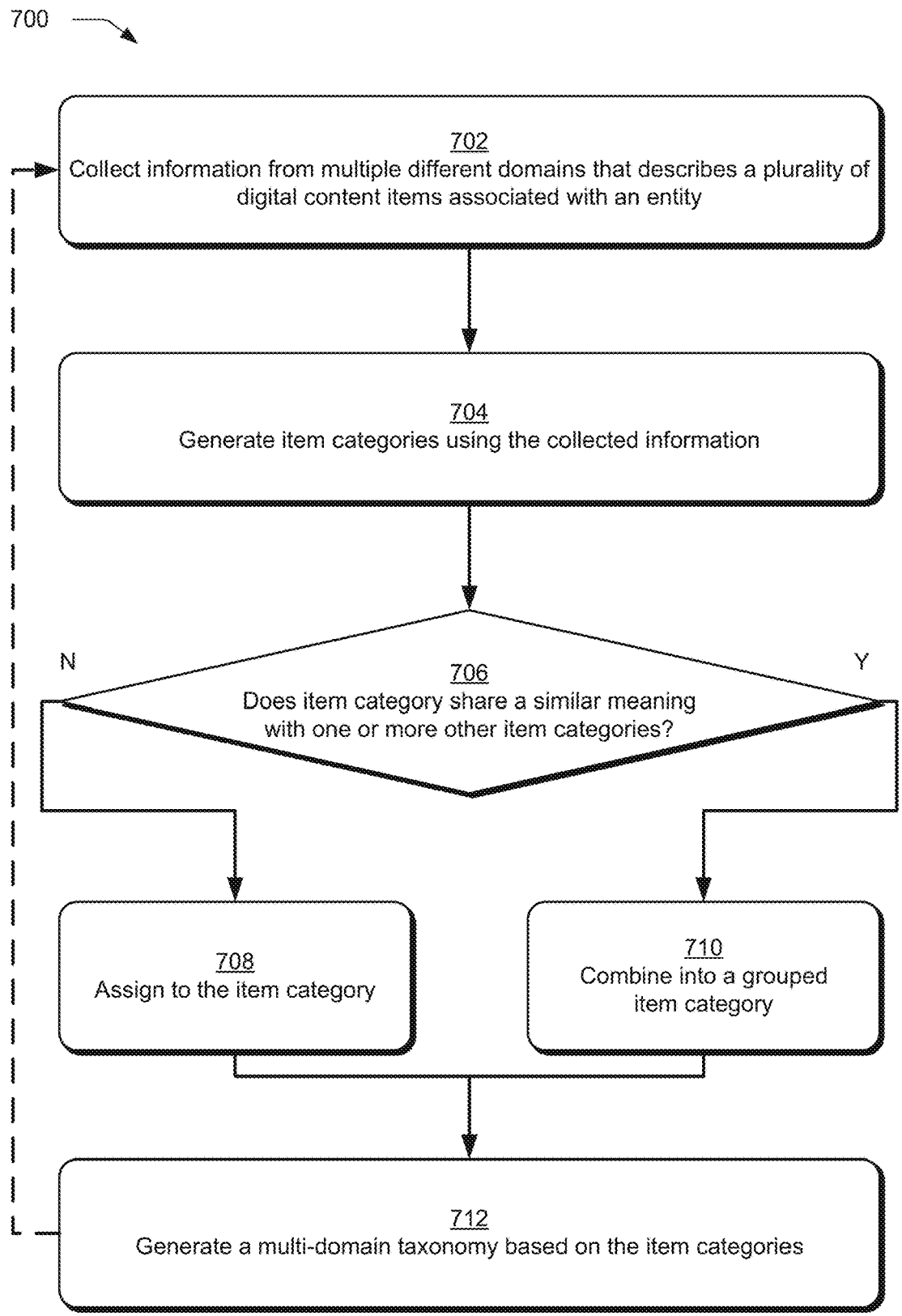
FIG. 7 is a flow diagram depicting a procedure in an example implementation for generating a multi-domain taxonomy using the techniques described herein.

FIG. 7 depicts a procedure 700 in an example implementation of generating a multi-domain taxonomy for a given item type of a digital content item using the techniques described herein. Information is collected from multiple different domains describing a plurality of digital content items that are associated with an entity and included in the multiple different domains (block 702). The taxonomy module 114 of the item placement configuration system 104, for instance, crawls the multiple different domains via the network 126 to identify various digital content items included in the multiple different domains that are associated with a particular entity, such as item 106 associated with entity 108. The collected information may include, for each item, information used to describe the item in the particular domain from which the item was collected. For instance, the collected information may include a textual description of the item in the domain from which it was collected, may include metadata associated with the item, user comments made relative to the item, combinations thereof, and so forth.

Item categories are generated using the collected information (block 704). The taxonomy module 114, for instance, analyzes the item information to identify a common item type associated with different ones of the plurality of digital content items collected from the plurality of different domains. Such a common item type may be used by the taxonomy module 114 to generate a top-level category for the plurality of items, such as an item category included in the tier-1 category column 302 of FIG. 3. After identifying a common item type associated with different ones of the plurality of digital content items, the taxonomy module 114 generates one or more subcategories for further classifying the plurality of digital content items. For instance, the taxonomy module may generate categories 312, 314, and 316, as included in the tier-2 category column 304 of FIG. 3. The taxonomy module 114 generates the one or more subcategories using the collected information associated with each item, such as respective textual descriptions used to identify each item on the respective domain from which it was collected.

For each of the item categories, a determination is made as to whether the item category shares a similar meaning with one or more other item categories (block 706). The taxonomy module 114, for instance, accounts for different word preferences that may be used to describe similar items in different domains and performs natural language processing to identify similarities among different categories that are represented as non-leaf nodes in the illustrated example of FIG. 3. In some implementations, the taxonomy module 114 performs stop-word removal and stemming, Word2Vec, k-means classification, combinations thereof, and the like, to identify whether different ones of the generated categories should be grouped together.

In response to determining that a certain item category does not share a similar meaning with one or more other item categories, the item category and any associated digital content items are assigned to an item category (block 708). The taxonomy module 114, for instance, may identify that the generated home & garden category 312 does not share a similar meaning with any other item category and assign the home & garden category 312, along with its included items lamps 318, umbrellas 320, and pillows 322 to the home & garden category 312.

In response to determining that a certain item category shares a similar meaning with one or more other item categories, the similar item categories are combined into a grouped item category (block 710). The taxonomy module 114, for instance, may determine that a "toys & hobbies" category shares a similar meaning with both a "hobbies & toys" category, a "hobbies" category, and a "toys category. In response to such a determination, the taxonomy module is configured to combine the four different categories into a single item category, such as the toys & hobbies category 314 illustrated in FIG. 3. Items associated with each of the four grouped categories are similarly associated with the toys & hobbies category 314, such as the trains 324 and the blocks 326.

A multi-domain taxonomy is then generated based on the item categories (block 712). The taxonomy module 114, for instance, generates multi-domain taxonomy 202, such as the data structure illustrated in the example implementation 300. The multi-domain taxonomy 202 is generated such that all items sharing a common item type collected from the different domains are assigned to a particular category or sub-category in a tree structure, where non-leaf nodes correspond to categories or sub-categories of different items, and leaf nodes represent particular instances of the different items at a finest level of granularity as represented in the multi-domain taxonomy. Each leaf node is further associated with an entity score, which indicates a degree of relevance between the item described in the leaf node of the multi-domain taxonomy and the particular entity, such as a percentage distribution of items associated with the particular entity relative to an overall number of the items as collected from the plurality of different domains. In order to construct a robust multi-domain taxonomy that includes entity scores for a plurality of different entities, the taxonomy module is configured to repeat the procedure of FIG. 7 for any number of different entities, as illustrated by the arrow returning to block 702 from block 712.

Figure 8:
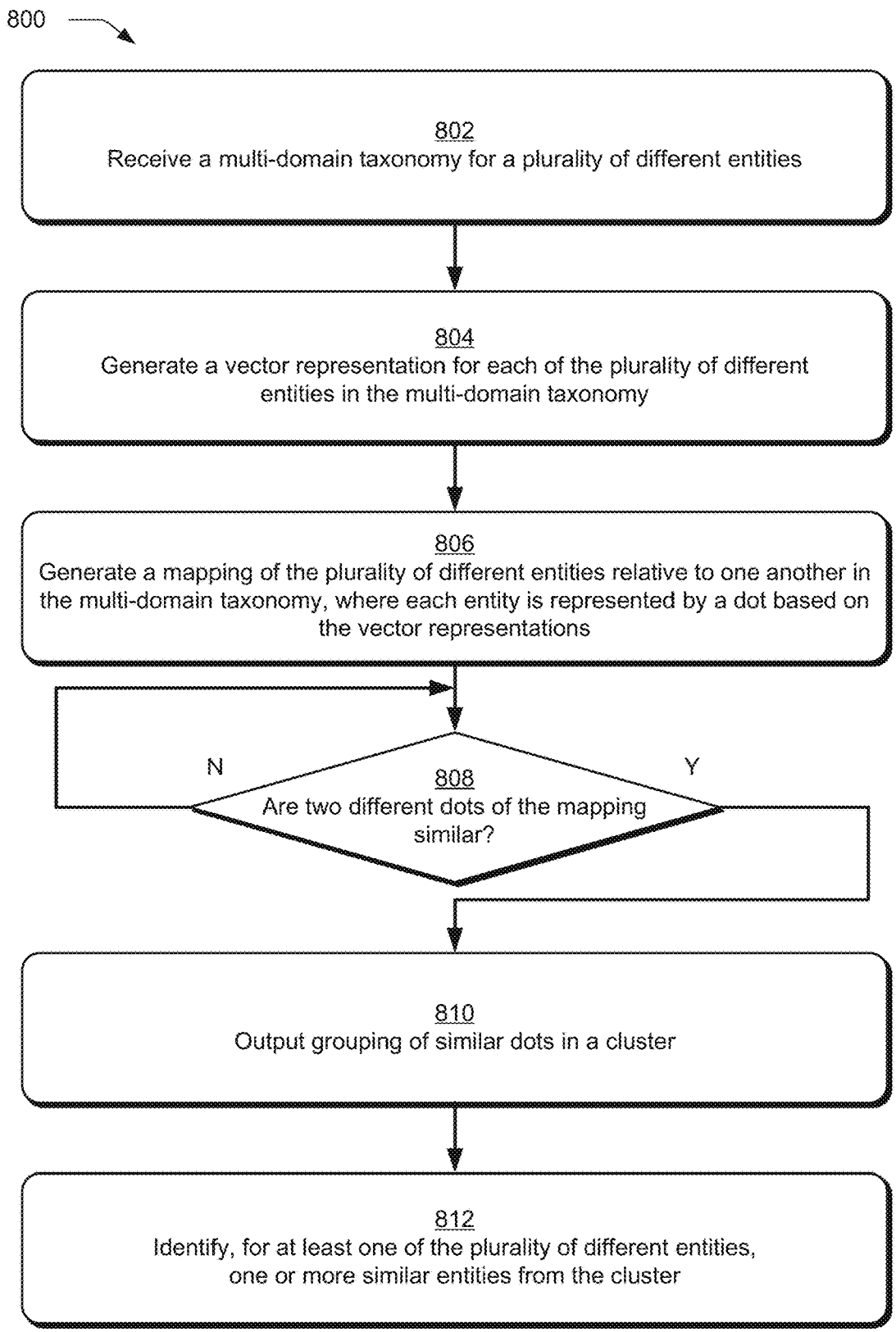
FIG. 8 is a flow diagram depicting a procedure in an example implementation for generating entity representations and identifying similar entities from the representations using the techniques described herein.

FIG. 8 depicts procedure 800 in an example implementation of generating one or more entity clusters and identifying similar entities from the entity clusters using the techniques described herein. A multi-domain taxonomy including information describing a plurality of different entities is received (block 802). The computing device implementing the item placement configuration system 104, for instance, receives multi-domain taxonomy 202. In some implementations, the multi-domain taxonomy 202 is received directly from the taxonomy module 114 of the item placement configuration system 104. Alternatively, the multi-domain taxonomy 202 may be received from a computing device that is remote from the computing device implementing the item placement configuration system 104, such as via network 126.

Upon receiving the multi-domain taxonomy, a vector representation is generated for each of the plurality of different entities included in the multi-domain taxonomy (block 804). The representation module 116, for instance, generates an entity representation 204 for each of the plurality of different entities included in the multi-domain taxonomy 202. To do so, the representation module 116 uses the entity scores for each different entity included in the multi-domain taxonomy 202 and generates a k-dimensional vector for the entity. Each dimension of the k-dimensional vector represents a grouped item category, such as one of the grouped items represented in the tier-3 category column 306 of FIG. 3, and a corresponding value for each dimension is generated based on the corresponding entity score as represented in the item classification value column 308 of FIG. 3. In this manner, the value for each dimension of the k-dimensional vector may be representative of an overall number of items associated with the particular entity across the plurality of different domains, may be representative of a percentage distribution of the correlating item in the tier-3 category column 306 for particular entity relative to an overall number of the correlating items, and so forth. Each k-dimensional vector generated by the representation module 116 is thus representative of one of the entity representations 204.

A mapping of the plurality of different entities is generated, where each entity is represented relative to other ones of the entities included in the multi-domain taxonomy as a dot based on its corresponding vector representation (block 806). The similarity module 118, for instance, generates a visual representation for each of the different entities in a two-dimensional or three-dimensional space using a t-distributed stochastic neighbor embedding (T-SNE) machine learning algorithm. Alternatively or additionally, the similarity module 118 may implement another nonlinear dimensionality reduction technique suitable for embedding higher-dimensional data into a low-dimensional space of two or three dimensions.

For each combination of two different dot representations, a determination is made as to whether the two different dots are similar to one another (block 808). In response to determining that the two dots are not similar to one another, the determination repeats for a different combination of two dot representations until two similar dots are identified, as indicated by the arrow returning to the beginning of block (808). In response to determining that two different dots of the mapping are similar, the two different dots are output in a cluster (block 810). The similarity module 118, for instance, is configured to output dot representations of two or more similar dots in an entity cluster 206. In some implementations, a number of different entity clusters 206 to be generated may be limited to a pre-designated number, such as ten different clusters. The number of different entity clusters 206 to be generated thus determines a degree of similarity by which two or more dots may be determined to be similar in the operation of block 808. For instance, in an example scenario where there is no limit placed on the amount of entity clusters 206 that the similarity module 118 may generate, the similarity module 118 may identify that every entity dot representation is in some degree similar to other ones of the entity dot representations and output each of the dot representations in a single entity cluster 206.

At least one or more similar entities are identified for at least one of the plurality of different entities in the cluster (block 812). The similarity module 118, for instance, analyzes the corresponding vector representations of two different entities as indicated by their respective entity representations 204 to determine a degree of similarity between the different entities. In some implementations, the similarity module 118 determines entity similarity by calculating the cosine distance between two k-dimensional vectors that each represent a different entity. Two or more similar entities are then output by the similarity module as the similar entities 208.

Figure 9:
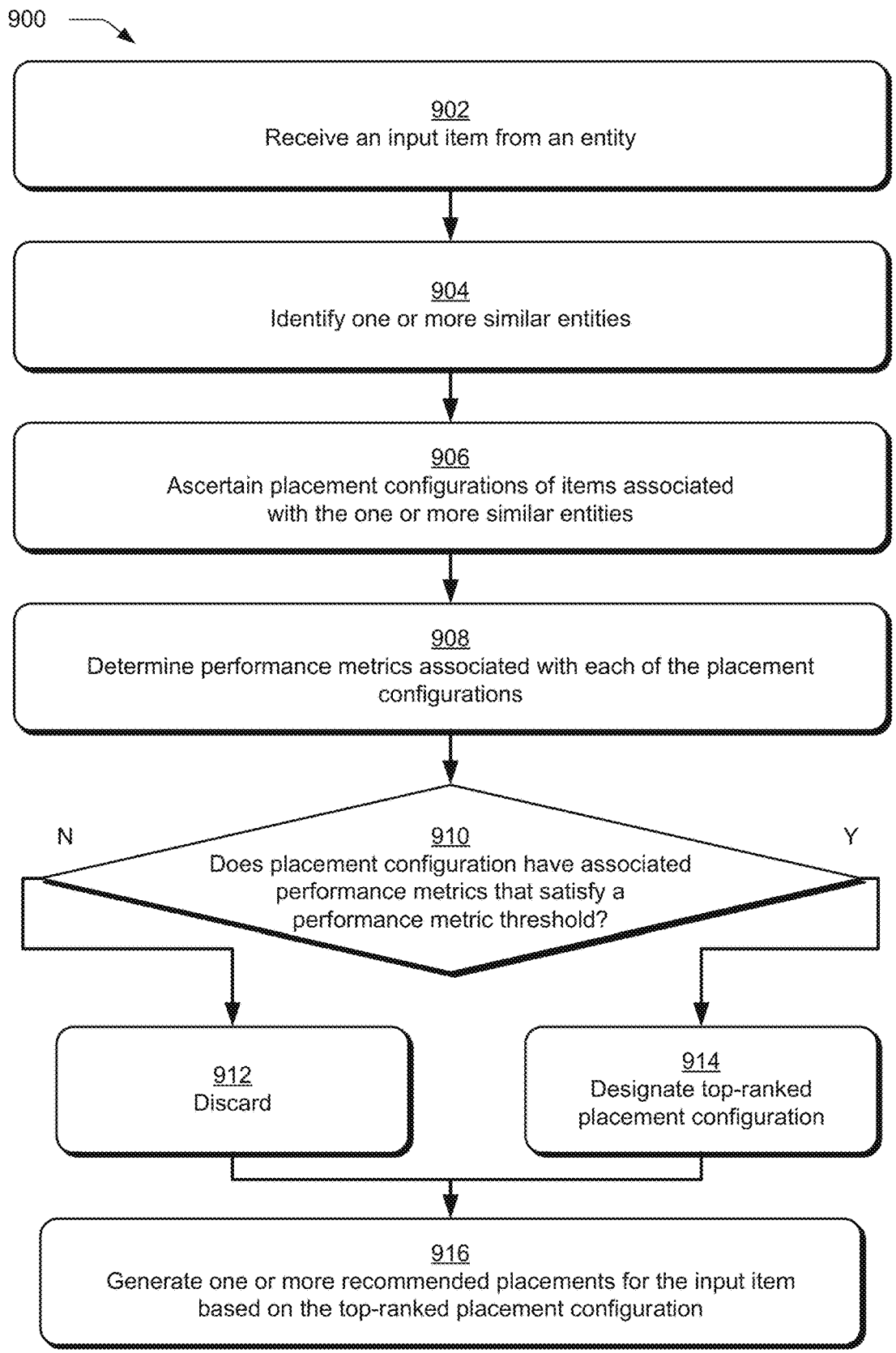
FIG. 9 is a flow diagram depicting a procedure in an example implementation for generating a recommended placement for a digital content item using the techniques described herein.

FIG. 9 depicts a procedure 900 in an example implementation of generating one or more recommended placements for an input item using the techniques described herein. An input item is received from an entity (block 902). The computing device implementing the item placement configuration system 104, for instance, receives item 106 from entity 108. In some implementations, the item placement configuration system 104 receives the item 106 directly from the entity 108. Alternatively, the item placement configuration system 104 receives the item 106 indirectly from a source other than the entity 108, along with an indication of an identity of the entity 108. In some implementations, the item placement configuration system 104 is configured to automatically ascertain an identity of the entity 108 from the item 106, such as via textual analysis of descriptive text accompanying the item 106, via metadata of the item 106, using image processing analysis of the item 106, by prompting a user of the item placement configuration system 104 to specify an identity of the entity 108, combinations thereof, and so forth. The item 106 is representative of any suitable form or type of digital content item, such as an image representative of a product or service offered for sale by the entity 108, text authored by entity 108 (e.g., a news story authored by a news service, a social media post authored by an individual, etc.), a video, an animated image file, combinations thereof, and so forth.

One or more similar entities are identified for the entity from which the input item was received (block 904). The similarity module 118, for instance, identifies one or more similar entities 208 for the entity 108 according to the procedure 700 of FIG. 7. One or more placement configurations of items associated with the one or more similar entities are ascertained (block 906). Performance metrics associated with each of the placement configurations are then determined (block 908). The placement module 120, for instance queries a database storing historic placement configurations for the similar entity 208 along with performance metrics associated with each of the historic placement configurations. In some implementations the database is a demand-side advertising platform implemented remotely from the item placement configuration system 104 that stores historic item placement configurations and performance metrics, such as total item impressions, item click-through rates, item conversions, and so forth, associated with each of the historic item placement configurations. The placement module 120 may identify one or more top-ranked placement configurations for the similar entities 208 and use the one or more top-ranked placement configurations as a basis for generating the recommended placements 210 for the item 106.

For each of the ascertained placement configurations, a determination is made as to whether the placement configuration has associated performance metrics that satisfy a performance metric threshold (block 910). The placement module 120, for instance, compares a total number of item impressions for each of the placement configurations to an item impression threshold, compares an item click-through rate for each of the placement configurations to a click-through rate threshold, compares an item conversion rate for each of the placement configurations to an item conversion rate threshold, compares a cost per impression for the placement configuration relative to a cost threshold, combinations thereof, and so forth. In some implementations, the performance metric threshold may be specified via user input to the item placement configuration system 104, such as via the targeting controls 608 included in the interface 602 of FIG. 6. Alternatively, the performance metric threshold may be automatically determined by the item placement configuration system 104, independent of user input.

In response to determining that a placement configuration does not have associated performance metrics that satisfy the performance metric threshold, the placement configuration is discarded (block 912). The placement module 120, for instance, may identify that one of the similar entities 208 has a placement configuration with associated placement metrics 212 that are less than or equal to the performance metric threshold and discard the placement configuration from consideration in generating a recommended placement for the item 106.

In response to determining that a placement configuration has associated performance metrics that satisfy the performance metric threshold, the placement configuration is designated as a top-ranked placement configuration (block 914). The placement module 120, for instance, may identify that one of the similar entities has a placement configuration with associated placement metrics 212 that are greater than or equal to the performance metric threshold and designate the placement configuration as a top-ranked placement configuration. In some implementations where multiple placement configurations are designated as top-ranked placement metrics, the placement module 120 is configured to rank the placement configurations relative to one another based on their associated performance metrics, such that one or more placement configurations can be selected from the best performance metrics.

One or more recommended placements are then generated for the input item based on one or more of the top-ranked placement configurations (block 916). The placement module 120, for instance, outputs one or more recommended placements 210 indicating how the item 106 should be placed in one or more domains as part of the configured user interface 214. The recommended placements 210 may be generated by the placement module 120 from any one or combination of multiple historic placement configurations associated with the similar entities 208, as identified based on their associated performance metrics. The recommended placement 210 is thus indicative of a manner in which the item 106 should be published on, or otherwise placed in, one or more domains for display to computing device users interacting with the domain. The recommended placements 210 may specify certain user interfaces in which the item should be placed, such as in specific application user interfaces, in specific websites, as accompanying certain other digital content items, combinations thereof, and so forth. The recommended placements 210 may alternatively or additionally specify that the item should be placed in user interfaces that are output for display to certain demographic groups, output in a certain language, output for display at certain geographic regions, output for display at certain times, combinations thereof, and so forth. In a similar manner, the recommended placements 210 may indicate certain user interfaces that should be excluded from including placement of the item. In some implementations, the placement configuration for an item further indicates various audience segments to which the item should be targeted for display, which in turn may affect other characteristics of a recommended placement configuration (e.g., user interface languages, user interface traffic types such as websites or applications, device-specific user interfaces, combinations thereof, and so forth).

Having described example procedures in accordance with one or more implementations, consider now an example system and device that can be utilized to implement the various techniques described herein.

Example System and Device

Figure 10:
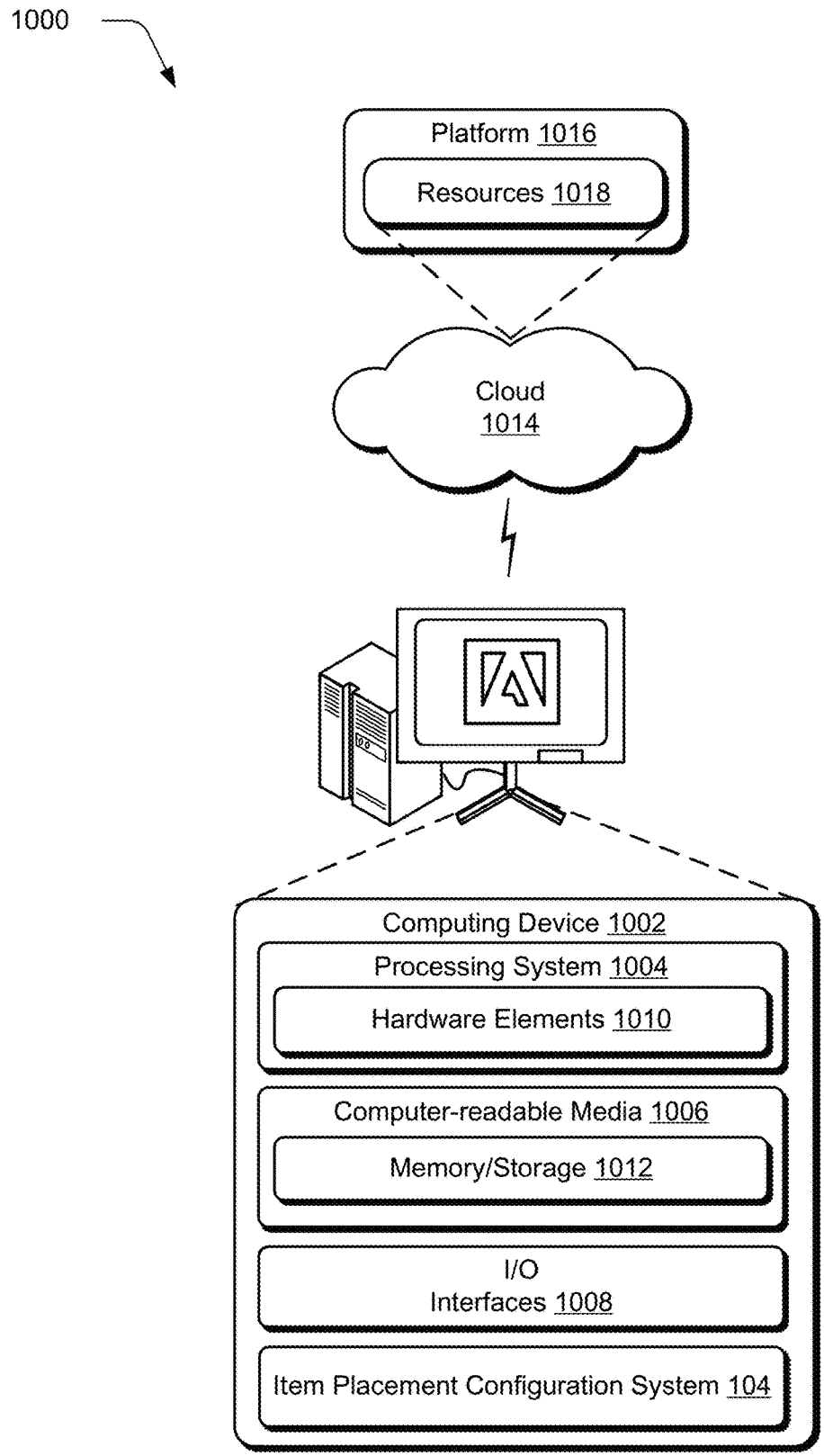
FIG. 10 illustrates an example system including various components of an example device that can be implemented as a computing device as described and/or utilized with reference to FIGS. 1-9 to implement the techniques described herein.

FIG. 10 illustrates an example system generally at 1000 that includes an example computing device 1002 that is representative of one or more computing systems and/or devices that may implement the various techniques described herein. This is illustrated through inclusion of the item placement configuration system 104. The computing device 1002 may be, for example, a server of a service provider, a device associated with a client (e.g., a client device), an on-chip system, and/or any other suitable computing device or computing system.

The example computing device 1002 as illustrated includes a processing system 1004, one or more computer-readable media 1006, and one or more I/O interface 1008 that are communicatively coupled, one to another. Although not shown, the computing device 1002 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1004 is representative of functionality to perform one or more operations using hardware. Accordingly, the processing system 1004 is illustrated as including hardware elements 1010 that may be configured as processors, functional blocks, and so forth. This may include implementation in hardware as an application specific integrated circuit or other logic device formed using one or more semiconductors. The hardware elements 1010 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1006 is illustrated as including memory/storage 1012. The memory/storage 1012 represents memory/storage capacity associated with one or more computer-readable media. The memory/storage component 1012 may include volatile media (such as random access memory (RAM)) and/or nonvolatile media (such as read only memory (ROM), Flash memory, optical disks, magnetic disks, and so forth). The memory/storage component 1012 may include fixed media (e.g., RAM, ROM, a fixed hard drive, and so on) as well as removable media (e.g., Flash memory, a removable hard drive, an optical disc, and so forth). The computer-readable media 1006 may be configured in a variety of other ways as further described below.

Input/output interface(s) 1008 are representative of functionality to allow a user to enter commands and information to computing device 1002, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1002 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1002. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1002, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1010 and computer-readable media 1006 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1010. The computing device 1002 may be configured to implement particular instructions and/or functions corresponding to the software and/or hardware modules. Accordingly, implementation of a module that is executable by the computing device 1002 as software may be achieved at least partially in hardware, e.g., through use of computer-readable storage media and/or hardware elements 1010 of the processing system 1004. The instructions and/or functions may be executable/operable by one or more articles of manufacture (for example, one or more computing devices 1002 and/or processing systems 1004) to implement techniques, modules, and examples described herein.

The techniques described herein may be supported by various configurations of the computing device 1002 and are not limited to the specific examples of the techniques described herein. This functionality may also be implemented all or in part through use of a distributed system, such as over a "cloud" 1014 via a platform 1016 as described below.

The cloud 1014 includes and/or is representative of a platform 1016 for resources 1018. The platform 1016 abstracts underlying functionality of hardware (e.g., servers) and software resources of the cloud 1014. The resources 1018 may include applications and/or data that can be utilized while computer processing is executed on servers that are remote from the computing device 1002. Resources 1018 can also include services provided over the Internet and/or through a subscriber network, such as a cellular or Wi-Fi network.

The platform 1016 may abstract resources and functions to connect the computing device 1002 with other computing devices. The platform 1016 may also serve to abstract scaling of resources to provide a corresponding level of scale to encountered demand for the resources 1018 that are implemented via the platform 1016. Accordingly, in an interconnected device embodiment, implementation of functionality described herein may be distributed throughout the system 1000. For example, the functionality may be implemented in part on the computing device 1002 as well as via the platform 1016 that abstracts the functionality of the cloud 1014.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A system having an item placement configuration component to generate a recommended placement for a digital content item, the system comprising:
  means for receiving a request for the recommended placement of the digital content item;
  means for ascertaining an item type of the digital content item and an entity associated with the digital content item;
  means for obtaining a multi-domain taxonomy for the item type, the multi-domain taxonomy describing how different entities relate to one another based on digital content items;
  means for identifying a multi-dimensional vector that represents the entity within the multi-domain taxonomy, each dimension of the multi-dimensional vector corresponding to a grouping of digital content items and being quantified by a value indicating a degree of relevance between the entity and the grouping of digital content items;
  means for identifying at least one of the different entities as being a similar entity by:

generating a mapping of the multi-domain taxonomy by embedding each of the different entities as a point in two-dimensional or three-dimensional space using a t-distributed stochastic neighbor embedding method; and embedding the multi-dimensional vector into the mapping of the multi-domain taxonomy using the t-distributed stochastic neighbor embedding method; and means for outputting a display of:

the recommended placement for the digital content item based on historic item placement configurations associated with the similar entity and independent of information specifying a cost threshold or an intended performance metric associated with placement of the digital content item;

an indication of the similar entity; and at least one performance metric for the similar entity.

2. The system of claim 1, wherein the display of the recommended placement for the digital content item identifies a particular user interface in which the digital content item should be placed, the particular user interface being defined for output based on one or more of a geographic region, a demographic audience, a display time, or a language.

3. The system of claim 1, wherein the recommended placement identifies one or more domains in which the digital content item should be placed.

4. The system of claim 1, wherein the recommended placement identifies one or more domains in which the digital content item should be excluded from placement.

5. The system of claim 1, wherein the recommended placement specifies a particular portion of a user interface in which the digital content item should be placed.

6. The system of claim 1, further comprising means for generating a configured user interface that presents the digital content item according to the recommended placement and outputting the configured user interface.

7. The system of claim 1, wherein outputting the recommended placement is performed independent of information specifying an intended target audience for the digital content item.

* * * * *